United States Patent Office 3,352,815
Patented Nov. 14, 1967

3,352,815
ARALKYL-PHENYL N-ARYL-THIOCARBAMATES
William Laszlo Bencze, New Providence, N.J., assignor to Ciba Corporation, New York, N.Y., a corporation of Delaware
No Drawing. Filed Mar. 8, 1965, Ser. No. 438,066
10 Claims. (Cl. 260—455)

The present invention concerns and has for its object the provision of aralkyl-phenyl N-aryl-thiocarbamates.

More particularly it comprises thiocarbamates of the formula

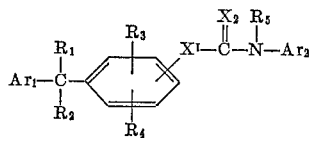

in which each of $Ar_1$ and $Ar_2$ stands for an aryl radical, $R_1$ and $R_2$ each, or taken together, for a mono- or divalent aliphatic radical respectively, $R_3$ and $R_4$ each for hydrogen, lower alkyl, halogeno or the group

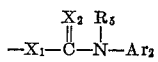

each of $X_1$ and $X_2$ for sulfur or one thereof for oxygen and the other for sulfur and $R_5$ for hydrogen or an aliphatic or araliphatic radical, as well as methods for their preparation.

An aryl radical $Ar_1$ and $Ar_2$ represents, for example, a mono- or bicyclic, carbocyclic or heterocyclic aryl radical, such as unsubstituted or substituted phenyl, 1- or 2-naphthyl or 2-, 3- or 4-pyridyl. Said substituted radicals contain one or more than one of the same or of different substituents which may be attached to any of the positions available for substitution. Such substituents are, for example, lower alkyl, e.g. methyl, ethyl, n-propyl, isopropyl, n-butyl or tertiary butyl, etherified hydroxy, especially lower alkoxy, e.g. methoxy, ethoxy, n-propoxy, isopropoxy, n-butoxy or secondary butoxy, esterified hydroxy, particularly halogeno, e.g. fluoro, chloro, bromo or iodo, halogeno-lower alkyl, e.g. trifluoromethyl, phenyl or phenyl substituted by any of the above groups. The groups $Ar_1$ and $Ar_2$ are primarily represented by phenyl, (lower alkyl)-phenyl, (lower alkoxy)-phenyl, (halogeno)-penyl, (trifluoromethyl)-phenyl, biphenylyl, naphthyl, and pyridyl.

A monovalent aliphatic radical $R_1$, $R_2$ and $R_5$ stands especially for lower alkyl, e.g. that mentioned above, preferably for methyl. They may also represent lower alkenyl, e.g. allyl or methylallyl, as well as cycloalkyl or cycloalkyl-lower alkyl having from three to eight, especially from five to six, ring carbon atoms, e.g. cyclopropyl, cyclopentyl, cyclohexyl, cycloheptyl or cyclooctyl, cyclopropylmethyl, cyclopentylmethyl, 2-cyclopentylethyl, cyclohexylmethyl, 1-cyclohexylethyl or cycloheptylmethyl. The groups $R_1$ and $R_2$ when taken together represent, for example, lower alkylidene or alkylene having preferably from two to seven carbon atoms, e.g. methylene, ethylidene, n-propylidene, isopropylidene, n-butylidene or n-hexylidene; 1,2-ethylene, 1,3-propylene, 1,4-butylene, 1,5-pentylene, 1,5- or 1,6-hexylene, or 1,7-heptylene. An araliphatic radical representing $R_3$ is, for example, monocyclic carbocyclic aryl-lower alkyl, e.g. benzyl, 1- or 2-phenylethyl.

Examples for $R_3$ and $R_4$ being lower alkyl or halogeno have been given above.

The compounds of the invention possess valuable pharmacological properties. For example, they exhibit antifungal activity, especially against fungi causing superficial dermatophytoses, such as Trichophyton mentagrophytes. They are, therefore, useful as antifungal agents, advantageously in the treatment of fungal infections of the skin, such as dermatophytosis (athlete's foot) and the like. Furthermore the new compounds may be used as starting materials or intermediates in the manufacture of other valuable compounds, especially medicines.

Particularly useful are compounds of the formula

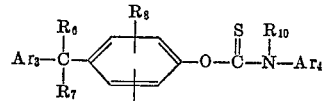

in which $Ar_3$ stands for phenyl, (lower alkyl)-phenyl, (halogeno)-phenyl or 4-biphenylyl, $Ar_4$ for phenyl, (lower alkyl)-phenyl, (lower alkoxy)-phenyl, (halogeno)-phenyl or naphthyl, each of $R_6$ and $R_7$ for lower alkyl, each of $R_8$ and $R_9$ for hydrogen, lower alkyl or the group

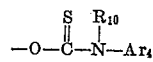

and $R_{10}$ for hydrogen or lower alkyl.

Compounds that are specially valuable are those of the formula

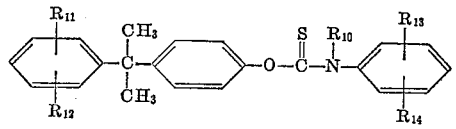

in which $R_{10}$ stands for hydrogen or lower alkyl and each of $R_{11}$, $R_{12}$, $R_{13}$ and $R_{14}$ for hydrogen, methyl, fluoro or chloro.

The compounds of the invention are prepared according to methods in themselves known. For example, the process for their manufacture consists in:

(a) Converting in a compound of the formula

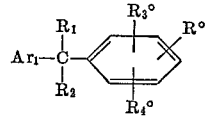

in which $R°$ stands for a substituent capable of being converted into the group

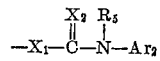

and each of $R_3°$ and $R_4°$ for hydrogen, lower alkyl, halogeno or $R°$, any substituent $R°$ into the group

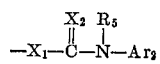

or (b) Converting in a compound of the formula

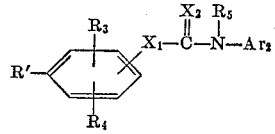

in which $R'$ stands for a group capable of being converted into the group

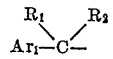

$R'$ into said group and, if desired, replacing in a compound obtained in which $X_2$ stands for oxygen and/or $R_5$ for hydrogen, $X_2$ by sulfur and/or $R_5$ by an aliphatic or araliphatic radical and/or exchanging in compounds in which $X_1$ stands for oxygen and $X_2$ for sulfur $X_1$ by $X_2$.

The substituent $R°$ represents, for example, hydroxy or mercapto or those groups salified with an alkali metal. Corresponding starting materials are converted into the compounds of the invention by reaction with an N-Ar$_2$-isothiocyanate or an N-R$_5$-N-Ar$_2$-thiocarbamic or -dithiocarbamic acid amide or halide, especially the chloride.

The substituent R° may also represent a halogenated particularly chlorinated, amidated or esterifier mono- or dithiocarbonic acid group, the latter may be esterified, for example with a lower alkyl-, free or esterified carboxyalkyl-, carbocyclic aryl- or carbocyclic aryl-lower alkylmercaptan, such as methyl-, ethyl-, carboxymethyl-, carbomethoxymethyl-, carbethoxymethyl-, phenyl- or benzylmercaptan. Corresponding starting materials are converted into the compounds of the invention by reaction with an N-R$_5$-N-Ar$_2$-amine.

The group R' represents, for example, a hydrogen atom, which can be replaced in the corresponding starting material by reaction with an Ar$_1$, R$_2$, R$_2$-methanol or -methyl halide, e.g. chloride or bromide, in the presence of a Lewis acid, particularly a Friedel-Crafts catalyst, e.g. aluminum chloride, ferric chloride or p-toluenesulfonic acid.

The group R' may also be a halogen atom, e.g. chloro, bromo or iodo, or a corresponding group after Grignardation. Corresponding starting materials are reacted with Ar$_1$, R$_1$, R$_2$-methyl halides, if necessary in the presence of a reactive metal or organic metal compound, such as an alkali metal, e.g. lithium, sodium or potassium or a zinc di-lower alkyl, e.g. zinc dimethyl.

In a compound obtained in which X$_2$ stands for oxygen, said atom may be replaced by sulfur, for example, by treatment with sulfur or sulfides, e.g. phosphorus pentasulfide.

In a resulting compound in which R$_5$ stands for hydrogen, this atom may be replaced by the action of a salt-forming agent, such as an alkali metal or the hydride thereof, and the metal compound obtained can be reacted with a reactive ester of an aliphatic or araliphatic alcohol, such as a halide, sulfate or sulfonate.

A compound obtained, in which X$_1$ stands for oxygen and X$_2$ for sulfur, may be isomerized into the corresponding compound in which X$_1$ stands for sulfur and X$_2$ for oxygen, for example, by subjecting it a sufficient time to elevated temperatures, advantageously about 30° below the boiling or degradation point respectively.

The above mentioned reactions are carried out according to standard methods, in the presence or absence of diluents, preferably such that are inert to the reagents and are solvents thereof, of catalysts, condensing agents and/or inert atmospheres, at low temperatures, room temperature or elevated temperatures and/or at atmospheric or superatmospheric pressure.

The starting material used in reaction (a), in which R° represents a halogenated, amidated or esterified mono- or dithiocarbonic acid group as specified above, is new and is intended to be included within the scope of the invention. Particularly valuable are compounds of the formula

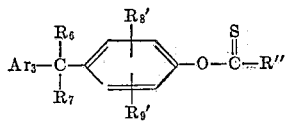

in which R'' stands preferably for a halogen atom, advantageously chloro, but also for amino, lower alkylmercapto, carboxy-lower alkylmercapto, carbo-lower alkoxy-lower-alkylmercapto, monocyclic carbocyclic arylmercapto or carbocyclic aryl-lower alkylmercapto and each of R$_8'$ and R$_9'$ for hydrogen, lower alkyl, halogeno or the group —O—CS—R''.

Especially useful is the starting material of the formula

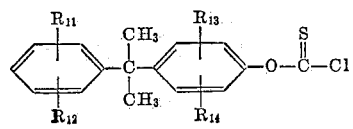

These compounds can be prepared from the phenols or thiophenols previously mentioned as starting material in process (a) by reacting them, or preferably a metal salt, e.g. alkali metal salt, thereof with a dihalogene-thiocarbonate, particularly thiophosgene or carbon disulfide and treating a free acid obtained, or a salt thereof, with a reactive ester of a corresponding alcohol, particularly a halide or sulfate, as well as with a carbocyclic aryl diazonium halide. A resulting thio- or dithiocarbonyloxy halide can also be reacted with ammonia in order to obtain the amide.

The remaining starting materials are known or, if new, may be prepared according to methods known per se. The phenols or thiophenols used in reaction (a) may be prepared analogously to the method shown under (b) whereas the starting material used in reaction (b) may be prepared analogously to the method shown under item (a). Any phenol or thiophenol may be converted into a salt thereof by treatment with a salt-forming reagent, such as an alkali metal hydride or amide, e.g. lithium hydride, sodium hydride, sodium amide or potassium amide, an alkali metal hydroxide, e.g. lithium, sodium or potassium hydroxide, or an alkali metal compounds of a hydrocarbon, e.g. butyl lithium, phenyl lithium or phenyl sodium, usually in the presence of a suitable solvent, e.g. liquid ammonia, hexane, benzene, toluent, xylene, diethyl ether, p-dioxane, tetrahydrofuran, diethyleneglycol dimethylether, N,N-di-methylformamide or ethanol, or a solvent mixture, the choice of which depends primarily on the type of reagent used and/or on the solubility properties of the starting material. Usually, the resulting salt is not isolated, but is directly employed either in the above reaction or in the preparation of starting materials having a hydroxyl group esterified with a thio or dithiocarbonic acid derivative.

The invention also comprises any modification of the process wherein a compound formed as an intermediate at any stage of the process, is used as the starting material and the remaining step(s) of the process is (are) carried out, as well as any new intermediates.

In the process of this invention such starting materials are preferably used which lead to final products mentioned in the beginning as preferred embodiments of the invention.

The compounds of the invention can be used for the manufacture of pharmaceutical compositions especially for topical use. These compositions contain a pharmacologically effective amount, for example from about 0.1 percent to about 10 percent, especially from about 0.5 percent to about 5 percent, of the compounds of the invention together with a pharmaceutical excipient. A composition for topical use in advantageously an emulsion preparation, e.g. a cream, ointment or lotion which, apart from the active ingredient, contains the usual carrier substances for such preparations, e.g. water, benzyl alcohol, cetyl alcohol, propylene glycol, polyethylene glycol, polysorbate, stearic acid, sodium lauryl sulfate, glyceryl monostearate, isopropyl myristate, sorbitan sesquioleate, lanolin, white petrolatum, liquid petrolatum, spermaceti or any other suitable carrier material, and, if necessary, auxiliary substances, such as activating agents, e.g. N,N-di-lower alkyl-formamides, for example, N,N-dimethyl-formamide, preserving agents, e.g. phenyl mercuric acetate, as well as stabilizing, wetting, emulsifying and/or coloring agents. The compositions, which may contain other pharmacologically active ingredients, particularly other antimicrobial agents, are prepared according to the standard methods employed in the art.

The following examples are intended to illustrate the invention and are not to be construed as being limitations thereon. Temperatures are given in degrees centigrade.

EXAMPLE 1

To a mixture of 8.0 g. of 3,N-dimethyl-aniline in 100 ml. of chloroform is added dropwise over a period of thirty minutes a solution of 9.8 g. of 4-(2-phenyl-2-propyl)-phenyl chlorothiocarbonate in 150 ml. of chloroform while cooling with running tap-water; the internal temperature is 24°. The reaction mixture is then stirred for three hours and evaporated to dryness under reduced pressure. The residue is taken up into diethyl ether; the solid material is filtered off and washed with diethyl ether to yield the 3,N-dimethyl-aniline hydrochloride. The filtrate is evaporated to dryness to yield 20.0 g. of a clear, red oil, which is dissolved in 100 ml. of diethyl ether; the organic solution is washed with water, twice with 2 N aqueous sodium hydroxide, water and a concentrated solution of sodium chloride in water, dried over sodium sulfate, and evaporated to dryness. The resulting 4-(2-phenyl-2-propyl)-phenyl N-methyl-N-(3-methyl-phenyl)-thiocarbamate of the formula

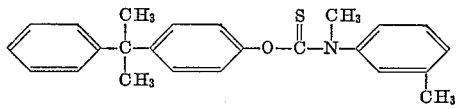

is purified by distillation and recovered at 200–205°/0.1 mm.; yield: 9.0 g. The yellow glassy material crystallizes from a mixture of hexane and pentane, and melts at 83–84°.

The starting material used in the above procedure is prepared as follows: a solution of 21.0 g. of 4-(2-phenyl-2-propyl)-phenyl in a mixture of 4.1 g. of sodium hydroxide in 250 ml. of water is obtained by warming and is then cooled in an ice-bath, whereupon a white precipitate is formed. The resulting mixture is added dropwise over a period of thirty minutes to a solution of 11.0 g. of 3,4-dichloro-aniline while stirring and cooling with running tap-water, the inside temperature being 20–22°. The excess of the 3,4-dichloro-aniline precipitates as the hydrochloride and is filtered off after stirring for ninety minutes. The filtrate is concentrated under reduced pressure to a volume of about 50 ml. and is diluted with 50 ml. of petroleum ether. After thirty minutes, the crystalline 4-(2-phenyl-2-propyl)-phenyl N-(3,4-dichloro-phenyl)-thiocarbamate of the formula

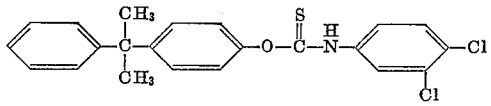

precipitates and is filtered off; yield: 10.5 g. It is dissolved in 150 ml. of warm chloroform; the organic solution is washed with water and 2 N aqueous sodium carbonate, swirled with sodium chloride, dried over sodium sulfate and evaporated to dryness under reduced pressure. Upon adding petroleum ether, the residue crystallizes; the precipitate is filtered off and melts at 145–148°.

Upon treatment of a solution of 4-(2-phenyl-2-propyl)-phenyl N-(3,4-dichloro-phenyl)-thiocarbamate in a mixture of toluene and N,N-dimethylformamide with an equivalent amount of a 53 percent suspension of sodium hydride in mineral oil and an equimolar amount of ethyl bromide, the 4-(2-phenyl-2-propyl)-phenyl N-ethyl-N-(3,4-dichloro-phenyl)-thiocarbamate is obtained.

EXAMPLE 3

The following compounds are prepared according to the above-described and illustrated procedure by selecting the appropriate starting materials:

| Starting Material | Reagent | Final Product |
|---|---|---|
| 4-(2-phenyl-2-propyl)-phenyl chlorothiocarbonate | 4-methoxy-N-methyl-aniline | 4-(2-phenyl-2-propyl)-phenyl N-(methoxy-phenyl)-N-methyl-thiocarbamate. |
| 4-(2-phenyl-2-propyl)-phenyl chlorothiocarbonate | N-ethyl-3-trifluoromethyl-aniline | 4-(2-phenyl-2-propyl)-phenyl N-ethyl-N-(3-trifluoromethyl-phenyl)-thiocarbamate. |
| 4-(2-phenyl-2-propyl)-phenyl chlorothiocarbonate | N-benzyl-aniline | 4-(2-phenyl-2-propyl)-phenyl N-benzyl-thiocarbamate. |
| 4-(2-phenyl-2-propyl)-phenyl chlorothiocarbonate | N-methyl-2-naphthylamine | 4-(2-phenyl-2-propyl)-phenyl N-methyl-N-(2-naphthyl)-thiocarbamate. |
| 4-[2-(4-chloro-phenyl)-2-propyl]-phenyl chlorothiocarbonate | 3,N-dimethyl-aniline | 4-[2-(4-chloro-phenyl)-2-propyl]-phenyl N-methyl-N-(3-methyl-phenyl)-thiocarbamate. |
| 4-[2-(4-chloro-phenyl)-2-propyl]-phenyl chlorothiocarbonate | N-cyclohexylaniline | 4-[2-(4-chloro-phenyl)-2-propyl]-phenyl N-cyclohexyl-N-phenyl-thiocarbamate. |
| 4-[3-(4-methyl-phenyl)-3-pentyl]-phenyl chlorothiocarbonate | 2-chloro-N-isopropyl-6-methyl-aniline | 4-[3-(4-methyl-phenyl)-3-pentyl]-phenyl N-isopropyl-N-(2-chloro-6-methyl-phenyl)-thiocarbamate. |
| 4-[2-(4-biphenylyl)-2-propyl]-phenyl chlorothiocarbonate | 4-bromo-N-methyl-aniline | 4-[2-(4-biphenylyl)-2-propyl]-phenyl N-(4-bromo-phenyl)-N-methyl-thiocarbamate. |
| 4-(1-phenyl-1-cyclohexyl)-phenyl chlorothiocarbonate | 4-fluoro-N-methyl-aniline | 4-(1-phenyl-1-cyclohexyl)-phenyl N-(4-fluoro-phenyl)-N-methyl-thiocarbamate. |
| 2-chloro-4-(2-phenyl-2-propyl)-phenyl chlorothiocarbonate | N-methyl-2-pyridyl-amine | 2-chloro-4-(2-phenyl-2-propyl)-phenyl N-methyl-N-(2-pyridyl)-thiocarbamate. |
| 2-chloro-6-methyl-4-(2-phenyl-2-propyl)-phenyl chlorothiocarbonate | N-ethyl-1-naphthylamine | 2-chloro-6-methyl-4-(2-phenyl-2-propyl)-phenyl N-ethyl-N-(1-naphthyl)-thiocarbamate. |
| 2-[3,4-di-(chlorothiocarbonyloxy)-phenyl]-2-phenyl-propane | 3,N-dimethyl-aniline | 2-(3,4-di-[N-methyl-N-(3-methyl-phenyl)-thiocarbamyloxy]-phenyl)-2-phenyl-propane. |
| 2-(4-chloro-phenyl)-2-[2,4-di-(chlorothiocarbonyloxy)-phenyl]-propane. | 4-ethoxy-N-methyl-aniline | 2-(4-chloro-phenyl)-2-(2,4-di-[N-(4-ethoxy-phenyl)-N-methyl-thiocarbamyloxy]-phenyl)-propane. | over a period of twenty minutes to a solution of 12.0 g. of thiophosgene in 200 ml. of chloroform while maintaining the temperature at 4–8° and stirring. After stirring for an additional thirty minutes at room temperature, the orange milky chloroform layer is separated, washed with a solution of 10 ml. of 2 N hydrochloric acid in 100 ml. of water, dried over sodium sulfate and evaporated under reduced pressure. The resulting 4-(2-phenyl-2-propyl)-phenyl chlorothiocarbonate of the formula

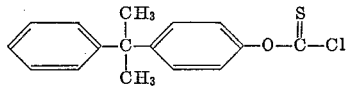

is purified by distillation and recovered at 145–170°/0.2 mm.; yield: 19.5 g.

EXAMPLE 2

A solution of 9.8 g. of 4-(2-phenyl-2-propyl)-phenyl chlorothiocarbonate in 150 ml. of chloroform is added

EXAMPLE 4

To 8.2 g. of 2-(4-chloro-phenyl)-2-(4-hydroxy-phenyl)-propane the solution of 1.36 g. of sodium hydroxide in 83 ml. of water is added and the solution obtained is added portionwise with stirring to 4.0 g. of thiophosgene in 67 ml. of chloroform at room temperature. After two hours the chloroform layer is separated, washed with 2 N hydrochloric acid, water and saturated sodium chloride solution, dried and filtered. The filtrate, containing the 4 - [2 - (4-chloro-phenyl)-2-propyl]-phenyl chlorothiocarbonate, is added dropwise over an hour period to a stirred solution of 8.0 g. of N-methyl-m-toluidine in 100 ml. of chloroform cooled with tapwater. After 3 hours of stirring the reaction mixture is evaporated to dryness under reduced pressure and the residue taken up in diethyl ether. After filtration, the ethereal solution is evaporated in vacuo and the so-obtained 4-[2-(4-chloro-phenyl)-2-propyl] - phenyl N - methyl-N-(3-methyl-phenyl)-thiocarbamate of the formula

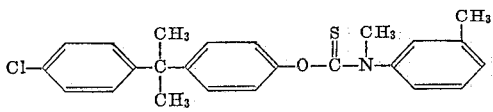

distill and collected at 213–230°/0.1 mm. After recrystallization, first from diethyl ether-petrolether and then from ethanol water, it melts at 97–98°.

EXAMPLE 5

Using in Example 4 instead of 8.2 g. of 2-(4-chlorophenyl)-2-(4-hydroxy-phenyl)-propane 7.5 g. of 2-(4-methyl--phenyl)-2-(4-hydroxy-phenyl)-propane and following the procedure given, there is obtained the 4-[2-(4-methyl-phenyl)-2-propyl]-phenyl N-methyl-N-(3-methyl-phenyl)-thiocarbamate of the formula

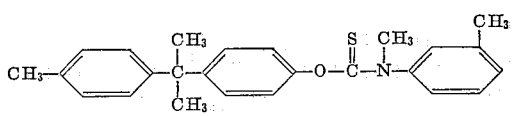

B.P. 207–230°/0.08 mm., M.P. 100–101°.

EXAMPLE 6

100.0 g. of an ointment containing 1% of the active ingredient are prepared as follows:

| Ingredients: | Grams |
| --- | --- |
| 4 - (2-phenyl-2-propyl)-phenyl N-methyl-N-(2-methyl-phenyl)-thiocarbamate | 1.0 |
| Liquid petrolatum | 5.0 |
| White petrolatum | 94.0 |

*Procedure.*—The thiocarbamate is mixed with the liquid petrolatum by using a mortar until an adequate reduction in particle size is accomplished. The white petrolatum is then slowly blended with this mixture; the ointment is passed through a three roller mill, until total uniformity is obtained and filled into epoxy-lined tubes (5.0 g.).

EXAMPLE 7

100.0 g. of cream, containing 1% of the active ingredient is prepared as follows:

| Ingredients: | Grams |
| --- | --- |
| 4-(2-phenyl-2-propyl)-phenyl N-methyl-N-(3-methyl-phenyl)-thiocarbamate | 1.0 |
| Propylene glycol | 15.0 |
| Sodium lauryl sulfate | 2.0 |
| Cetyl alcohol | 15.0 |
| Phenyl mercuric acetate | 0.002 |
| Purified water, q.s. | |

*Procedure.*—The phenylmercuric acetate is dissolved in 65 ml. of water at 90°; subsequently the sodium lauryl sulfate is added and the temperature is reduced to 70°. The cetyl alcohol is melted at 70° and added to the aqueous solution while vigorously agitating. Stirring is continued while cooling the mixture to 45°.

The thiocarbamate is dispersed in the propylene glycol at 45° and added to the above emulsion while agitating. Sufficient water is added to bring the weight to 100 g., and mixing is continued while the product cools to room temperature. The cream is passed through a three roller mill until total uniformity is accomplished and is filled into epoxy-lined tubes (5 g.).

EXAMPLE 8

3000.0 g. of a cream containing 2% of the active ingredient is prepared as follows:

| Ingredients: | Grams |
| --- | --- |
| 4 - (2 - phenyl - 2 - propyl) - phenyl N - methyl - N - (3 - methyl - phenyl) - thiocarbamate | 60.0 |
| Glyceryl monostearate | 225.0 |
| Lanolin, anhydrous | 30.0 |
| Isopropyl myristate | 90.0 |
| Polyethylene glycol 4000 monostearate | 300.0 |
| Stearic acid | 390.0 |
| Sorbitan sesquioleate | 15.0 |
| Spermaceti | 180.0 |
| Propylene glycol | 150.0 |
| Polysorbate 60 | 45.0 |
| Purified water, q.s. | |

*Procedures.*—The glyceryl monostearate, the lanolin, the isopropyl myristate, the polyethylene glycol 4000 monostearate, the stearic acid, the sorbitan sesquioleate, and the spermaceti are melted together at 80° on the water bath. The water required and containing the polysorbate 60 is added while stirring at 80°; stirring is continued until the temperature drops below 40°. The mixture of the thiocarbamate in propylene glycol is added; stirring is continued and water is added to bring the weight precisely to 3000.0 g. The cream is passed through a homogenizer and filled into tubes.

In the manner described in Examples 6 to 8 creams can be obtained that contain as the active ingredient the product obtained according to Examples 4 or 5.

What is claimed is:
1. A compound of the formula

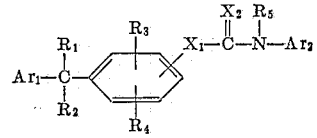

in which each of $Ar_1$ and $Ar_2$ stands for an aryl radical, each of $R_1$ and $R_2$ for a monovalent aliphatic radical and, when taken together, for a divalent aliphatic radical, each of $R_3$ and $R_4$ for a member selected from the group consisting of hydrogen, lower alkyl, halogeno and the group

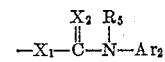

one of $X_1$ and $X_2$ is sulfur and the other is a member selected from the group consisting of oxygen and sulfur and $R_5$ for a member selected from the group consisting of hydrogen, an aliphatic radical and an araliphatic radical.

2. A compound of the formula

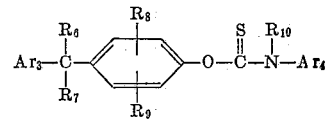

in which $Ar_3$ stands for a member selected from the group consisting of phenyl, (lower alkyl) - phenyl, (halogeno)-phenyl and 4 - biphenylyl, $Ar_4$ for a member selected from the group consisting of phenyl, (lower alkyl) - phenyl, (lower alkoxy) - phenyl, (halogeno) - phenyl and naphthyl, each of the groups $R_6$ and $R_7$ for lower alkyl, each of $R_8$ and $R_9$ for a member selected from the group consisting of hydrogen, lower alkyl, halogeno and the group

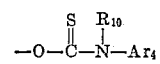

and $R_{10}$ for a member selected from the group consisting of hydrogen and lower alkyl.

3. A compound of the formula

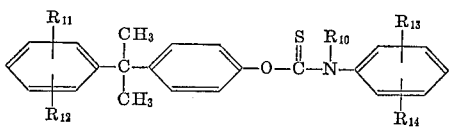

in which $R_{10}$ stands for a member selected from the group consisting of hydrogen and lower alkyl and each of $R_{11}$, $R_{12}$, $R_{13}$ and $R_{14}$ for a member selected from the group consisting of hydrogen, methyl, fluoro and chloro.

4. 4 - (2 - phenyl - 2 - propyl) - phenyl N - methyl - N - (3 - methyl - phenyl) - thiocarbamate.
5. 4 - (2 - phenyl - 2 - propyl) - phenyl N - (3,4 - dichloro - phenyl) - thiocarbamate.
6. 4 - [2 - (4 - chloro - phenyl) - 2 - propyl] - phenyl N - methyl - N - (3 - methyl - phenyl) - thiocarbamate.
7. 4 - [2 - (4 - methyl - phenyl) - 2 - propyl] - phenyl N - methyl N - (3 - methyl - phenyl) - thiocarbamate.
8. A compound of the formula

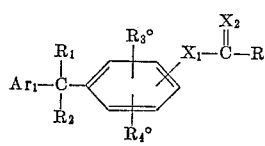

in which $Ar_1$, stands for an aryl radical, each of $R_1$ and $R_2$ for a monovalent aliphatic radical and, when taken together for a divalent aliphatic radical, each of $R_3°$ and $R_4°$ for a member selected from the group consisting of hydrogen, lower alkyl, halogeno, and

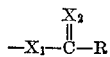

one of $X_1$ and $X_2$ is sulfur and the other is a member selected from the group consisting of oxygen and sulfur and R is a member selected from the group consisting of chloro, amino, lower alkylmercapto, carboxy-lower alkylmercapto, carbo-lower alkoxy - lower - alkylmercapto, monocyclic carboxylic arylmercapto and carbocyclic aryl-lower alkylmercapto.

9. A compound of the formula

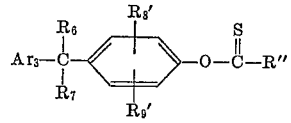

in which $Ar_3$ stands for a member selected from the group consisting of phenyl, (lower alkyl) - phenyl, (halogeno)-phenyl and 4 - biphenylyl, each of $R_6$ and $R_7$ for lower alkyl, each of $R_8'$ and $R_9'$ for a member selected from the group consisting of hydrogen, lower alkyl, halogeno and the group —O—CS—R'' and R'' for a member selected from the group consisting of chloro, amino, lower alkylmercapto, carboxy - lower alkylmercapto, carbo-lower alkoxy - lower - alkylmercapto, monocyclic carbocyclic arylmercapto and carbocyclic aryl - lower alkylmercapto.

10. A compound of the formula

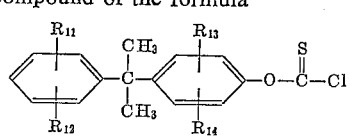

in which each of $R_{11}$, $R_{12}$, $R_{13}$ and $R_{14}$ stands for a member selected from the group consisting of hydrogen, methyl, fluoro and chloro.

No references cited.

CHARLES B. PARKER, *Primary Examiner.*

B. BILLIAN, *Assistant Examiner.*